United States Patent
Orsatti et al.

(10) Patent No.: US 9,112,546 B2
(45) Date of Patent: Aug. 18, 2015

(54) PROCESS FOR PERFORMING NEAR FIELD COMMUNICATION (NFC) IN AN INTEGRATED CIRCUIT OR PACKAGE ALSO INCLUDING A FM RECEIVER

(75) Inventors: Daniel Orsatti, La Gaude (FR); Onno Marcel Kuijken, Oosterbeek (NL); Pablo Ignacio Gimeno Monge, Nice (FR); Steven Terryn, Denderleeuw (BE); Roland Van Der Tuijn, Mouans-Sartoux (FR)

(73) Assignee: ST-Ericsson SA, Plan-Les-Ouates (CH)

( * ) Notice: Subject to any disclaimer, the term of this patent is extended or adjusted under 35 U.S.C. 154(b) by 302 days.

(21) Appl. No.: 13/516,726

(22) PCT Filed: Dec. 21, 2010

(86) PCT No.: PCT/EP2010/007829
§ 371 (c)(1),
(2), (4) Date: Aug. 22, 2012

(87) PCT Pub. No.: WO2011/076385
PCT Pub. Date: Jun. 30, 2011

(65) Prior Publication Data
US 2013/0045679 A1    Feb. 21, 2013

(30) Foreign Application Priority Data
Dec. 21, 2009  (EP) .................................. 09368052

(51) Int. Cl.
*H04B 5/00*  (2006.01)
*H04B 5/02*  (2006.01)
*H04B 15/06* (2006.01)
*H04B 7/08*  (2006.01)

(52) U.S. Cl.
CPC . *H04B 5/02* (2013.01); *H04B 15/06* (2013.01)

(58) Field of Classification Search
USPC .......................................... 455/41.1, 63.1, 501
See application file for complete search history.

(56) References Cited

U.S. PATENT DOCUMENTS

| 2006/0084383 A1* | 4/2006 | Ibrahim et al. .............. 455/41.2 |
| 2006/0269021 A1* | 11/2006 | Ibrahim et al. ................ 375/346 |
| 2008/0081631 A1 | 4/2008 | Rofougaran |
| 2008/0233871 A1* | 9/2008 | Rofougaran et al. ......... 455/41.2 |
| 2008/0267275 A1* | 10/2008 | Li et al. ......................... 375/228 |

OTHER PUBLICATIONS

Patent Cooperation Treaty; International Search Report and Written Opinion of PCT/EP2010/007829; Donato Lustrini; dated Jul. 3, 2011; 9 pages.
Patent Cooperation Treaty; International Preliminary Report on Patentability of PCT/EP2010/007829; Yolaine Cussac; dated Jun. 26, 2012; 6 pages.

* cited by examiner

*Primary Examiner* — Ayodeji Ayotunde
(74) *Attorney, Agent, or Firm* — Howison & Arnott LLP

(57) ABSTRACT

A process for performing Near Field Communication (NFC) between a first NFC device and a second NFC device is provided. The first NFC device includes an NFC transceiver and an FM receiver which are both integrated into the same chip. The provided process involves initializing the first NFC device to perform a device detection polling loop for detecting a second NFC device. The device detection polling loop has activity detection periods, which occur periodically. The first NFC transceiver may then perform a slicing procedure, which slices the activity detection periods into small time slots. Each time slot has a duration smaller than a predetermined value so as to reduce the noise generated by harmonics of the NFC operation frequency which might be audible to the user.

15 Claims, 3 Drawing Sheets

PROCESS FOR PERFORMING NEAR FIELD COMMUNICATION (NFC) IN AN INTEGRATED CIRCUIT OR PACKAGE ALSO INCLUDING A FM RECEIVER

CROSS-REFERENCE TO RELATED APPLICATIONS

This application is a U.S. National Phase application submitted under 35 U.S.C. §371 of Patent Cooperation Treaty application serial no. PCT/EP2010/007829, filed Dec. 21, 2010, and entitled A PROCESS FOR PERFORMING NEAR FIELD COMMUNICATION (NFC) IN AN INTEGRATED CIRCUIT OR PACKAGE ALSO INCLUDING A FM RECEIVER, which application claims priority to European patent application serial no. 09368052.8, filed Dec. 21, 2009, and entitled A PROCESS FOR PERFORMING NEAR FIELD COMMUNICATION (NFC) IN AN INTEGRATED CIRCUIT OR PACKAGE ALSO INCLUDING A FM RECEIVER.

Patent Cooperation Treaty application serial no. PCT/EP2010/007829, published as WO 2011/076385, and European patent application serial no. 09368052.8, are incorporated herein by reference.

TECHNICAL FIELD

The invention relates to the field of wireless communications and more particularly to a process for performing Near Field Communication (NFC) between a first NFC device and a second NFC device, the first device including a FM receiver.

BACKGROUND

Near Field Communication (NFC) is a high-frequency wireless communication method applied in devices that are spaced from each other within about a distance of 10 cm. The NFC technology is an extension of the ISO/IEC 14443 proximity-card standard (Radio-Frequency Identification (RFID), contactless card) that combines the interface of an integrated circuit card (smartcard) and a reader into a single device.

Specifically, NFC communication occurs between two NFC compatible devices, and particularly between an initiator device and a target device. The initiator device chooses the bit rate of data transmission and initializes the communication with the target device.

Furthermore, NFC technology can operate in an active or a passive communication mode discussed below and all NFC devices are assumed to support both communication modes.

Analytically, in a so-called passive mode, an initiator device provides a carrier field and a target device answers by modulating this field. In the passive mode, the target draws operating power from the initiator's electromagnetic field and the target device's receiver is only required to acknowledge its presence when polled.

On the other hand, in an active mode, both the initiator device and the target device communicate by generating their own field. In this mode, both devices typically need a power supply.

In order to establish the above mentioned NFC communication between an initiator and a target device which are both NFC compatible, a device detection polling loop is applied. The device detection polling loop can be used by an initiator device to detect a target device or it can be used by a target device for being detected by an external initiator device.

More particularly, during the device detection polling loop, a periodic scanning detection process is performed. The periodic scanning detection, detects different data formats of an external device that can be either an initiator device or a target device.

Nowadays, the trend in wireless connectivity market is to integrate several connectivity cores in single chips. Specifically, in 3G generation, Global Positioning System (GPS), Bluetooth (BT) and FM cores are integrated in only one chip. Nevertheless, next generation chips are expected to additionally integrate the NFC connectivity core.

However, the above mentioned NFC core integration provokes significant impairments in the quality of NFC communication because of the close proximity of the NFC core and the FM core into the chip.

The close proximity of the two above mentioned cores results to interfering effects between the harmonics of the NFC core operation frequency (13.56 MHz) and the frequency of the FM broadcast band, when the FM core is tuned to a channel or frequency (hereinafter designed as the FM operation frequency) which is an harmonic of the NFC frequency. Specifically, the highest impact on the interference comes from the permanent function of the device detection polling loop operating in the NFC frequency.

Thus there is a need to improve the NFC communication between NFC compatible devices and decrease the interference effect resulting from the integration of an FM core and an NFC core in a single chip, which interference particularly arises when a tuned FM core frequency matches a harmonic of the NFC core operation frequency.

SUMMARY

It is an object of the present invention to provide a process for performing Near Field Communication (NFC) between a first NFC device and a second NFC device, the first NFC device including a FM receiver.

It is another object of the invention to provide a process for decreasing the interference effect resulting from the integration of a FM receiver and a NFC transceiver in a single chip included in a NFC device.

Those and other objects are achieved by means of a process for performing Near Field Communication (NFC) between a first NFC device and a second NFC device. The first NFC device includes a NFC transceiver and a FM receiver which are integrated in a same chip.

The process involves the steps of:

initializing the NFC device for performing a device detection polling loop for detecting any second NFC device, the device detection polling loop comprising activity detection periods which occur periodically;

performing within said NFC transceiver a slicing of the activity detection periods in small time slots, each having a duration inferior to one predetermined value so as to reduce the noise generated by harmonics of the NFC operation frequency and which might be audible to the user.

In one embodiment, the time slots are randomly scheduled within the polling loop.

Preferably, the process further performs a blanking of the audio signal received by said FM receiver, said blanking occurring during said time slots.

In one embodiment there is determined the FM operation frequency of the FM receiver and the latter is compared with all possible harmonics of the NFC communication. Based on that comparison, the process enables the slicing operation in order to reduce the noise audible to the user when the FM operation frequency is too close to the NFC operation frequency.

Preferably, the predetermined value is set to 10 milliseconds.

The invention also provides a NFC device which includes NFC transceiver integrated together with a FM receiver.

The NFC device comprises:

means for initializing a device detection polling loop for detecting a second NFC device on the basis of periodical activity detection periods;

means for slicing said activity detection periods in time slots having a duration inferior to one predetermined value;

whereby the noise generated by harmonics of the NFC operation frequency is reduced in the FM receiver.

Preferably, the NFC device means for randomly scheduling said time slots within the polling loop.

In one embodiment the NFC device further includes a FM blanking circuit for switching off the FM audio signal received by said FM receiver during said time slots.

Preferably, the NFC device includes control unit, which can be for instance a Central Processing Unit (CPU) allowing easy software configuration, which compares the FM operation frequency used by said FM receiver with harmonics of the NFC operation frequency and, further to said comparison, for controlling the blanking of the FM audio signal.

Preferably, the time slots are set to have a duration inferior to 10 milliseconds so as to minimize the audible effects to the user of the FM receiver.

The invention is adapted to achieve integration of the NFC device together with the FM receiver either in a System on Chip (SOC) or System in Package (SIP) configuration.

BRIEF DESCRIPTION OF THE DRAWINGS

Other features of one or more embodiments of the invention will best understood by reference to the following detailed description when read in conjunction with the accompanying drawings.

DETAILED DESCRIPTION

The invention described below is implemented in NFC compatible devices. As known by the skilled man, a wide range of devices and machines are likely to become NFC compatible devices, including mobile phones, turnstiles, parking meters, check-out cash registers or "point-of-sale" equipment, ATMs, house and garage doors, personal computers, posters, street signs, bus stops, local points of interest (with NFC-readable tags only), product packaging, etc.

A first NFC device can communicate with a wide range of NFC devices and particularly with a second device complying with the existing ISO/IEC 14443 standard (relating to integrated circuit cards also designated as smartcards) and readers. The technology is standardized in ISO/IEC18092, ECMA-340 (European association for standardizing information and communication systems), and ETSI 102.190 (European Telecommunications Standards Institute). It operates within the globally available and unregulated RF band of 13.56 MHz with data transfers of 106 kbps, 212 kbps and 424 kbps per second.

However, the process which will be described below can be adapted to a wide range of existing or future formats.

The general trend of NFC designers is to integrate those NFC functionalities with other circuits such as, for instance, a FM receiver which is widely used in the public.

In such a situation, the use of the frequencies mentioned above might clearly become a significant source of interference for the FM audio circuits.

Figure 1:
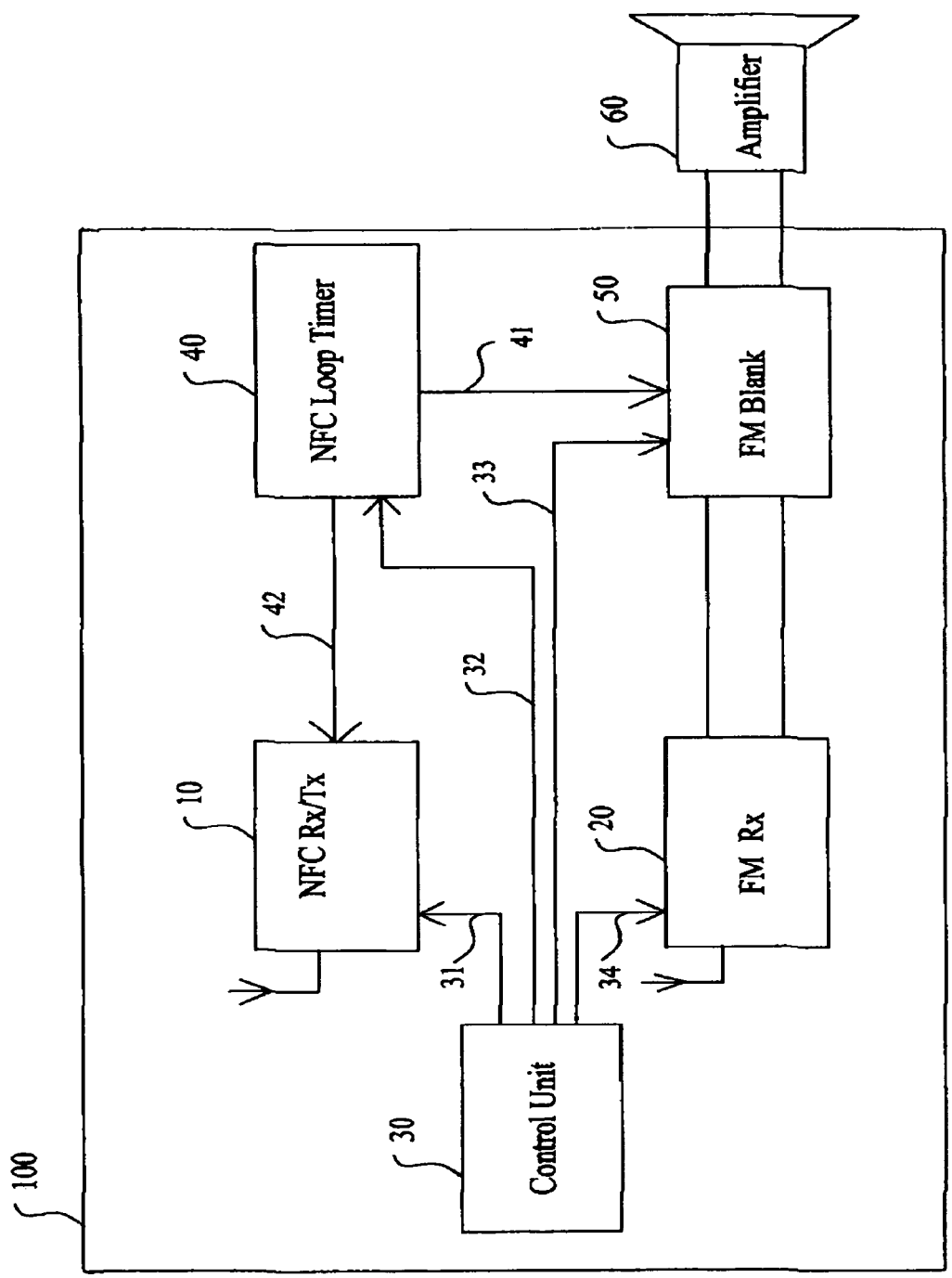
FIG. 1 illustrates a Near Field Communication (NFC) device according to one embodiment.

FIG. 1 illustrates an architecture of a NFC device 100 which comprises a NFC transceiver 10 which is integrated in a same chip than a FM receiver 20. One should understand that the integration into a same chip may encompasses both the situation of the integration within a single die (which is referred to a System On Chip SOC designation) and the integration of two distinct dies in a same package, referred to as System in Package (SIP).

In one embodiment, the NFC transceiver 10 is able to transmit and receive a RF signal carrying data in its operation frequency (13.56 MHz) while the FM receiver 20 receives a FM signal carrying a modulated audio signal in its operation frequency varying between 87.5 to 108.0 MHz.

It can be seen that an interference effect may arise when the FM operation frequency is tuned to a frequency between the $6^{th}$ and the $8^{th}$ harmonics of the operation frequency of the NFC transceiver 10.

NFC device 100 also includes a control unit 30 which executes the hereinafter described process and also provides a set of control signals via control leads 31-34, required for controlling the different components of the NFC device 100.

Also, the NFC device 100 of the invention includes a NFC loop timer 40 which controls the NFC transceiver 10 through a control lead 42 and a FM blank circuit 50 connected with the FM receiver 20, also receiving a control signal through a lead 41 from NFC Loop timer 40. Furthermore, the NFC device 100 includes an amplifier 60.

It will be shown that the control unit 30, the NFC loop timer 40 and the FM blank circuit 50 cooperate together for the purpose of improving the reception of the FM audio signal.

Figure 3:
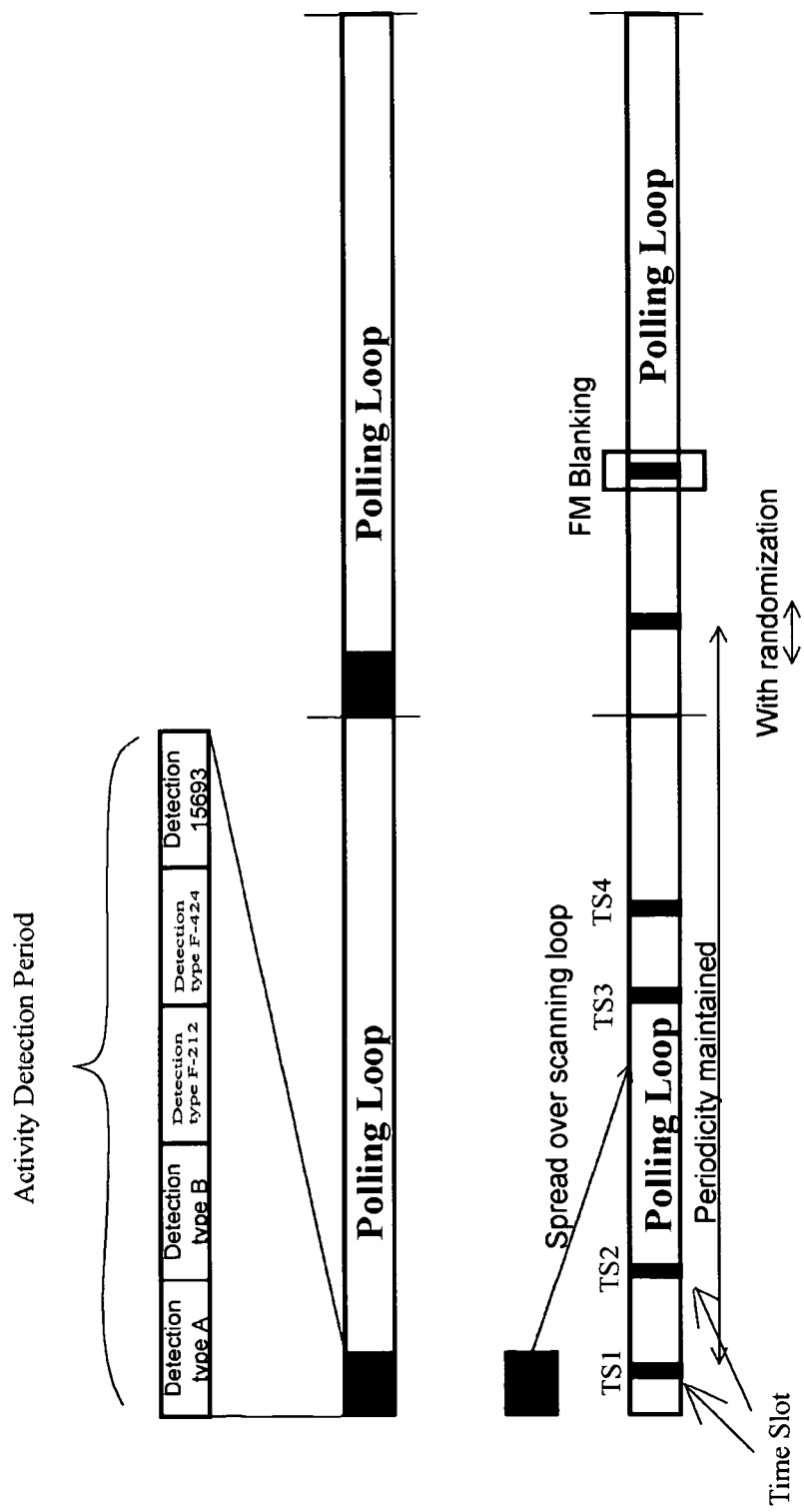
FIG. 3 illustrates the scanning process of the device detection polling loop.

This is achieved by means of the slicing of the NFC activity detection period in smaller slices or time slots TS1, TS2, TS3 or TS4 etc. as shown in FIG. 3, each corresponding to one particular data format which can be applicable by a second NFC device preferably less than 10 milliseconds and scheduling those time slots within the NFC scanning or polling loop by means of NFC loop timer 40, and also controlling the FM blank circuit so as to switch off the audio signal during those time slots. The slices or time slots can be built, for example, by starting the RF carrier signal, waiting for the corresponding setup time, modulating the RF carrier signal according to one of the particular data formats, waiting for the corresponding response time, and stopping the RF carrier signal.

Preferably the slicing process is controlled by control unit 30 which determines, by means of a comparison of the active FM frequency being used by the FM receiver and the possible harmonics of the NFC operation frequency, whether the slicing of the NFC activity detection period is appropriate or not.

Also, in one embodiment, the NFC loop timer 40 performs a random scheduling of the time slots assigned to the different NFC activity detection.

Figure 2:
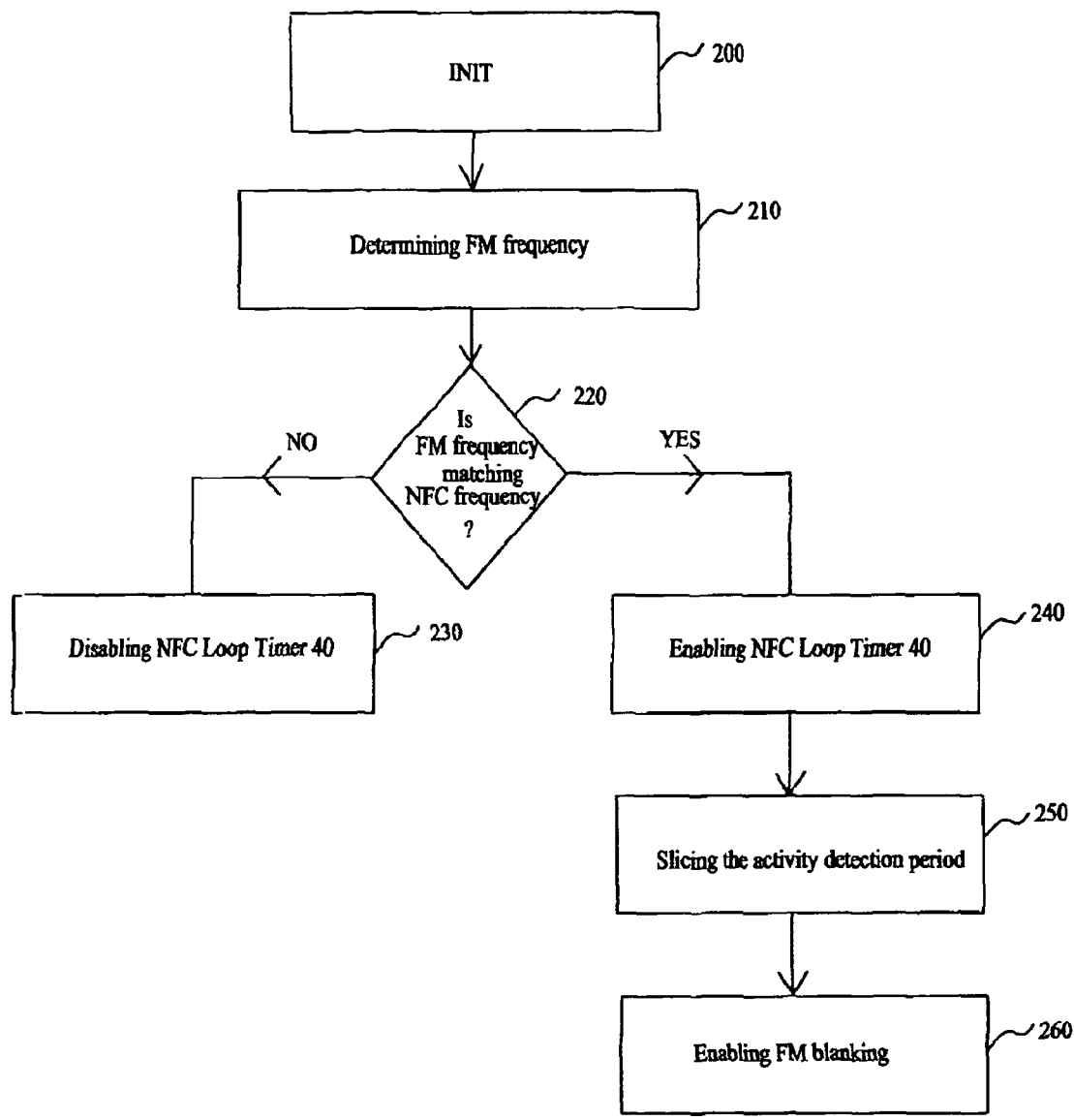
FIG. 2 illustrates one embodiment of the process.

With respect to FIG. 2, there will now be described a preferred embodiment of a process for performing Near Field Communication (NFC) between NFC device 100 and another NFC compatible device. The NFC device 100 comprises both a NFC transceiver 10 and a FM receiver 20. The FM transceiver 10 operates in a NFC frequency and the FM receiver 20 operates in a FM frequency.

Both the FM receiver and the NFC transceiver are integrated in a single chip and thus interference might occur if the FM operation frequency of the FM receiver is tuned to a frequency that matches the harmonics of the NFC operation frequency. This interference significantly impairs the above mentioned NFC communication that takes place when the first NFC device and the second NFC device are brought within close proximity (around 10 centimeters).

Referring to FIG. 2 again, one sees that, In a step 200, the process starts with an initialization of the NFC device 100. In particular, the FM audio circuits, including the FM blank circuit 50, are initialized so as to allow FM audio playing through amplifier 60.

In addition, the NFC device 100 is also initialized regarding the NFC functionalities which are performed in accordance with known procedures.

In particularly, the initialization includes the initialization of the NFC device detection polling loop. During that phase, the NFC device receives data signals from another NFC compatible device. These data signals correspond to different data formats according to different protocols of different standards, and well known to the skilled man.

In one embodiment, the NFC device can be in an initiator mode. In that case, the NFC device sends a signal to initiate communication with the NFC compatible device that is in a target mode.

Alternatively, in another embodiment, the NFC device can be in a target mode. In that case, the NFC device receives the signal send by a NFC compatible device being in initiator mode.

As illustrated in FIG. 3, the device detection polling loop is performed periodically over subsequent scanning periods or polling loops. Also, the different data formats (i.e. detection type A, detection type B, detection type F-212, detection type F-424, detection 15693 etc.) are received by the NFC device during an activity detection period or chunk at the beginning of each polling loop.

In one embodiment, the polling loop is designed to support all implemented protocols and is software configured.

In a step 210, the process proceeds with the determination of the active FM frequency being used by the FM receiver. This is achieved by Control Unit (CU) 30 which exchanges information with the FM receiver via (not represented) communication channel. Generally speaking, control unit 30 is embodied by means of a Central Processing Unit (CPU) which handles all high level control of the different components of the device and, therefore, is perfectly aware of the different parameters of such devices, including, in the case of FM Receiver 20, the operating frequency being used by the user.

In a step 220, the process proceeds with performing a comparison between the FM operation frequency and the different harmonics of the NFC operation frequency.

This comparison is performed by the CU 30 in order to determine whether there could be a possible pollution of the FM audio signal. Specifically, the FM audio signal may be polluted if there is a match or close proximity between the channel or FM operation frequency and the different harmonics of the NFC operation frequency.

If the FM operation frequency does not correspond to one possible harmonics of the NFC communication, then the process proceeds to a step 230, where the CU 30 disables the NFC loop timer 40 as well as the FM blank circuit 50, respectively by means of control leads 32 and 33.

This results in the fact that both circuits, NFC transceiver 10 and FM receiver 20, although located in the same chip package, operate independently since there is very limited risk of interference.

If there is a match in the comparison of the step 220, then the process proceeds to a step 240 where Control unit 30 enables the NFC loop timer 40 by means of control leads 32.

Consequently, NFC loop timer 40 initiates the slicing of the NFC activity detection period in small time slots, in a step 250.

Practically, the slicing is achieved by generating appropriate control signals on lead 42 which are forwarded to NFC transceiver 10, which results in the generation of short time slots as illustrated in FIG. 3. The time slots take the form of bursts.

In one embodiment, the time slots are scheduled randomly so as to reduce the audible effects for the user of the FM blanking process.

Similarly, NFC loop timer 40 generates a control signal on a lead 41 which is forwarded to FM blank circuit 50, and which is active during the time slots which are scheduled on the NFC polling loop.

In one preferred embodiment, the slicing is performed in such a way that the time slots are less than 10 ms.

Then the process proceeds to a step 260, where CU 30 activates control lead 33 so as to enable FM blanking.

Consequently, FM blanking circuit 50 starts performing blanking operation in accordance with control signal received on lead 41 and which results in the switch off of the audible FM signal being presented at the input of the audio amplifier.

Practically, one may take advantage of one special transistor, such as a MOS transistor, having its gate control lead driven by control lead 41.

Since, in the preferred embodiment, the slicing performed by NFC loop timer 40 generates activity time slots of less than 10 ms, the corresponding audio blanks will not be audible to the user.

It should be noticed that the activation of FM blanking circuit 50 by control lead 33 is optional. However, when it is not activated, the improvement of the FM audio signal is only achieved by means of the random "slicing" introduced in the NFC activity detection scanning (performed by block 40).

Clearly, when the control unit activates control lead 33, the FM blanking circuit 50 significantly improves the quality of the audio signal.

The invention claimed is:

1. A process for performing Near Field Communication (NFC) between a first NFC device and a second NFC device, said first NFC device including a NFC transceiver and a FM receiver both integrated in a same chip, said NFC transceiver operating at a NFC operation frequency and said FM receiver operating at a FM operation frequency which can be effected by a harmonic of the NFC operation frequency, said process comprising:

initializing said first NFC device to perform a periodic device detection polling loop for detecting said second NFC device, said periodic device detection polling loop comprising a loop period and an NFC activity detection period over a continuous portion of the periodic device detection polling loop period; and performing within said NFC transceiver a slicing of said activity detection period into a plurality time slots within the periodic device detection polling loop, such that each time slot has a duration that is less than a predetermined value in order to reduce noise generated by the harmonic of the NFC operation frequency that effects receipt of the FM operation frequency, which is audible to a user.

2. The process according to claim 1, wherein each one of the time plurality of slots are randomly scheduled within the periodic device detection polling loop.

3. The process according to claim 1, further comprising:
performing a blanking of an audio signal received by said FM receiver, said blanking occurring during the same time as each one of the plurality of time slots.

4. The process according to claim 1, further comprising:
determining the FM operation frequency;
comparing the FM operation frequency with relative harmonics of the NFC operation frequency; and
enabling the performing of the slicing of NFC activity detection period into time slots when said FM operation frequency is close to the harmonic of said NFC operation frequency.

5. The process according to claim 1, wherein said predetermined value of the duration of each time slot is set to about 10 milliseconds.

6. The process according to claim 1, further comprising setting said first NFC device in an initiator mode or in a target mode.

7. The process according to claim 1, wherein said device periodic detection polling loop detects NFC formats comprising detection type A, detection type B, detection type F-212, detection type F-424, and detection 15693.

8. A Near Field Communication (NFC) device comprising an NFC transceiver and an FM receiver both integrated in a same chip, said NFC transceiver operating at an NFC operation frequency and said FM receiver operating at an FM operation frequency which can be effected by a harmonic of the NFC operation frequency, said NFC device comprising:
a device detection polling loop module configured to establish a periodic polling loop comprising an activity detection period for detecting a second NFC device; and
a slicing module configured to slice said activity detection period into time slots within the periodic polling loop when the harmonic of the NFC operating frequency is within the FM operating frequency, each time slot having a duration that is less than a predetermined value;
whereby noise generated by harmonics of the NFC operation frequency is reduced in the FM receiver.

9. The Near Field Communication (NFC) device according to claim 8, further comprising a scheduler adapted to randomly schedule said time slots within the polling loop.

10. The Near Field Communication (NFC) device according to claim 8, further comprising a blanking module adapted to blank the audio signal received by said FM receiver during said time slots.

11. The Near Field Communication (NFC) device according to claim 8, further comprising a control unit configured to compare the FM operation frequency used by said FM receiver with harmonics of the NFC operation frequency and, further configured to enable said blanking module.

12. The Near Field Communication (NFC) device according to claim 8, wherein said predetermined value is set to about 10 milliseconds.

13. The Near Field Communication (NFC) device according to claim 8, wherein the NFC device is configured to detect NFC formats including: detection type A, detection type B, detection type F-212, detection type F-424, detection 15693.

14. The Near Field Communication (NFC) device according to claim 8, wherein the chip that the FM receiver and the NFC transceiver are integrated into is a System on Chip (SOC) or a System in Package (SIP) integration.

15. The Near Field Communication (NFC) device according to claim 8, wherein the device detection polling loop module comprises software.

* * * * *